(12) United States Patent  
Fleck et al.

(10) Patent No.: US 6,259,438 B1
(45) Date of Patent: Jul. 10, 2001

(54) COORDINATE INPUT STYLUS

(75) Inventors: David C. Fleck, Vancouver; Scott Rawlings, Camas, both of WA (US); Yasuyuki Fukushima, Saitama (JP)

(73) Assignee: Wacom Co., Ltd. (JP)

( * ) Notice: Subject to any disclaimer, the term of this patent is extended or adjusted under 35 U.S.C. 154(b) by 0 days.

(21) Appl. No.: 09/090,307

(22) Filed: Jun. 4, 1998

(51) Int. Cl.[7] ............ G09G 5/00; G08C 21/00; G06K 11/18
(52) U.S. Cl. .......... 345/184; 345/179; 178/19.01
(58) Field of Search ............ 178/18.01–18.11, 178/19.01–19.07; 345/179–184

(56) References Cited

U.S. PATENT DOCUMENTS

| | | | |
|---|---|---|---|
| 4,878,553 | 11/1989 | Yamanami et al. | 178/18.07 |
| 5,004,871 | 4/1991 | Purcell | 178/19.04 |
| 5,014,044 | 5/1991 | Murray | 178/19.01 |
| 5,028,745 | 7/1991 | Yamanami et al. | 178/18.07 |
| 5,055,831 | 10/1991 | Padula | 178/19.01 |
| 5,061,828 | 10/1991 | Purcell | 345/173 |
| 5,109,141 | 4/1992 | Purcell | 178/19.04 |
| 5,111,005 | 5/1992 | Smith et al. | 178/18.01 |
| 5,231,380 | 7/1993 | Logan | 345/156 |
| 5,327,161 | 7/1994 | Logan et al. | 345/157 |
| 5,469,194 | 11/1995 | Clark et al. | 345/173 |
| 5,506,605 | 4/1996 | Paley | 345/163 |
| 5,565,658 | * 10/1996 | Gerpheide et al. | 178/19.01 |
| 5,613,137 | 3/1997 | Bertram et al. | 710/129 |
| 5,666,113 | 9/1997 | Logan | 341/34 |
| 5,681,220 | 10/1997 | Bertram et al. | 463/37 |
| 5,682,019 | 10/1997 | Katsurahira et al. | 178/18.07 |
| 5,714,984 | 2/1998 | Fukuzaki et al. | 345/174 |
| 5,717,435 | 2/1998 | Fukuzaki et al. | 345/179 |
| 5,731,801 | 3/1998 | Fukuzaki | 345/146 |
| 5,731,807 | 3/1998 | Feierbach | 345/163 |
| 5,734,377 | 3/1998 | Fukuzaki | 345/173 |
| 5,805,144 | * 9/1998 | Scholder et al. | 345/163 |
| 5,852,260 | * 12/1998 | Yoshikawa | 178/18.01 |
| 5,864,098 | * 9/1998 | Shinohe | 178/19.01 |
| 5,898,136 | * 4/1999 | Katsurahira | 178/18.01 |
| 5,959,616 | * 9/1999 | Challener | 178/19.05 |
| 5,969,296 | * 10/1999 | Yamamoto et al. | 178/18.01 |
| 6,005,555 | * 12/1999 | Katsurahira et al. | 345/174 |

OTHER PUBLICATIONS

Reexamination Certificate B1 4,878,553, Yamanami, et. al., Sep. 16, 1997.

* cited by examiner

Primary Examiner—Richard Hjerpe
Assistant Examiner—Benjamin D. Bowers
(74) Attorney, Agent, or Firm—Liniak, Berenato, Longacre & White, LLC

(57) ABSTRACT

A stylus for use in a coordinate input system (e.g. digitizer tablet system) includes a finger wheel. The degree of rotation of the finger wheel by the user determines the extent to which a chosen graphical parameter (e.g. line thickness, color, shading, gray scale, etc.) is varied. Thus, a user can easily vary the graphical parameter while drawing by merely rotating the finger wheel about its fixed rotational axis. Preferably, rotation of the wheel causes an intermediate gear wheel with teeth thereon to rotate which in turn causes a potentiometer to detect the degree of rotation of the finger wheel. In alternative embodiments of this invention, a touchpad for inputting finger position and/or finger pressure information may be provided on the side of the stylus instead of the finger wheel.

10 Claims, 11 Drawing Sheets

Fig. 3A
SECTION E-E

Fig. 3F
SECTION J-J

Fig. 3B
SECTION D-D

Fig. 3G
SECTION I-I

Fig. 3C
SECTION C-C

Fig. 3H
SECTION H-H

Fig. 3D
SECTION B-B

Fig. 3I
SECTION G-G

Fig. 3E
SECTION A-A

Fig. 3J
SECTION F-F

COORDINATE INPUT STYLUS

This invention relates to a stylus device for use with a digitizer or other coordinate input system. More particularly, this invention relates to a pointing stylus including a rotatable side wheel, wherein manipulation and rotation of the side wheel enables the user to vary a graphical or control parameter (e.g. line thickness, color, pen-stroke, shading, line texture, etc.) of an image being drawn via the coordinate input system. Other possible uses include scrolling in text documents with the finger wheel, navigation in a third dimension of a 3D space, zooming in and out of a document or graphical representation, and the like. In certain embodiments, a touchpad may replace the finger wheel on the side of the stylus.

BACKGROUND OF THE INVENTION

Pointers for use in conjunction with coordinate input systems are known in the art. For example, see U.S. Pat. Nos. 5,731,807; 5,028,745; 5,061,828; 5,109,141; 5,055,831; and 5,004,871, the disclosures of which are hereby incorporated herein by reference. These pointers may be used in conjunction with coordinate input systems, such as digitizer systems.

U.S. Pat. No. 5,731,807 discloses a mouse for inputting coordinate data into a coordinate input system. Unfortunately, some users of graphics tablets dislike mouse devices and prefer stylus-like devices for drawing because of their aesthetic feel.

U.S. Pat. No. 5,004,871 discloses stylus having a pressure sensitive side switch which protrudes outwardly from a housing at an angle which is transverse to the housing. The magnitude of force (i.e. pressure) applied to the switch determines the signal which is output by the stylus. Unfortunately, the transverse alignment of the switch relative to the housing in the '871 patent, and the switch's transverse movement relative to the housing's axis, are undesirable. The transverse extension or protrusion of the switch renders it susceptible to damage, and furthermore it is difficult for some users to accurately adjust transverse finger pressure while writing (e.g. drawing) with the stylus. In sum, the requirement for accurate and adjustable transverse finger pressure during drawing strokes is undesirable and difficult to achieve, as is the requirement for transverse protrusion of a stylus side switch. It would be desirable if these characteristics could be eliminated.

U.S. Pat. No. 5,109,141 discloses a digitizer stylus including a switch moveable along the side of the housing, and wherein the switch retains the position it is moved to after it is released by the user. The switch in the '141 patent is movable along the housing side parallel to a longitudinal axis of the housing. These features of the '141 side switch are undesirable. Firstly, it is undesirable to have to move a switch along the side of a housing while drawing. Second, it is undesirable to have a side switch that is moveable along the housing side parallel to a longitudinal axis of the housing because the requirement for such movement during drawing or stroke movement is undesirable, and requires sliding finger movements which do not adequately simulate air brush use and which are often not desirable during stroke movement of the stylus.

It should be apparent that there exists a need in the art for a stylus which can simulate air-brush usage, wherein the stylus includes a finger input device (e.g. finger wheel or touchpad) that can be easily used during drawing stokes, and where the finger manipulatable input device (i) does not protrude transversely relative to the stylus housing, (ii) does not require transverse device movement, (iii) does not require sliding device movement parallel to the stylus' longitudinal axis, and (iv) does not require device or switch movement along a side of the housing.

It is a purpose of this invention to fulfill the above described needs in the art, as well as other needs which will become apparent to the skilled artisan from the following detailed description of certain embodiments of this invention.

SUMMARY OF THE INVENTION

Generally speaking, this invention fulfills the above-described needs in the art by providing a stylus for use in a digitizer coordinate input system, the stylus comprising:

a housing;

electronic circuitry disposed within the housing;

a rotatable finger wheel or dial that is rotatable about a central axis by a user, wherein a degree to which the finger wheel is rotated determines the extent to which a control or graphical parameter utilized by the digitizer coordinate input system is varied;

the finger wheel including a plurality of teeth defined in a peripheral portion thereof;

a gear wheel including a first set of gear wheel teeth for meshing with the teeth of the finger wheel and a second set of gear teeth for meshing with corresponding teeth on a potentiometer so that the potentiometer detects the degree θ to which the finger wheel is rotated and causes the parameter to be varied as a function thereof; and wherein the first set of teeth on the gear wheel defines a peripheral portion having a different or smaller diameter than a peripheral portion of the second set of teeth on the gear wheel.

This invention further fulfills the above-described needs in the art by providing a stylus comprising:

a housing;

a printed circuit board including at least one substantially flat surface disposed inside of the housing, the printed circuit board having at least one chip mounted thereon and the one flat surface of the printed circuit board defining a plane;

a button disposed on a side of the stylus, the button being pressable inward along a button axis toward a longitudinal axis of the stylus in order to cause the stylus to output data indicative of a change in status of the button, and wherein the button axis and the longitudinal axis of the stylus are substantially perpendicular to one another; and wherein the button axis is substantially parallel to the plane of the printed circuit board.

This invention further fulfills the above-described needs in the art by providing a stylus for use in a coordinate input system, the stylus including a touch sensitive area having no moving parts exposed for A manipulation by a user, wherein the touch sensitive area enables a user to adjust a graphical parameter of an image being drawn by varying the user's finger position or the finger's pressure applied in the touch sensitive area. In certain embodiments, the touch sensitive area on the stylus may be implemented such that it measures finger position in the area and/or finger pressure applied in the area. The combination of sensing both finger position and pressure in the touch sensitive area would enable a user to manipulate two degrees of freedom with the touch sensitive area or side pad.

This invention will now be described with reference to certain embodiments thereof as illustrated in the following drawings.

DETAILED DESCRIPTION OF CERTAIN EMBODIMENTS OF THIS INVENTION

Referring now more particularly to the accompanying drawings in which like reference numerals indicate like parts throughout the several views.

Figure 1:
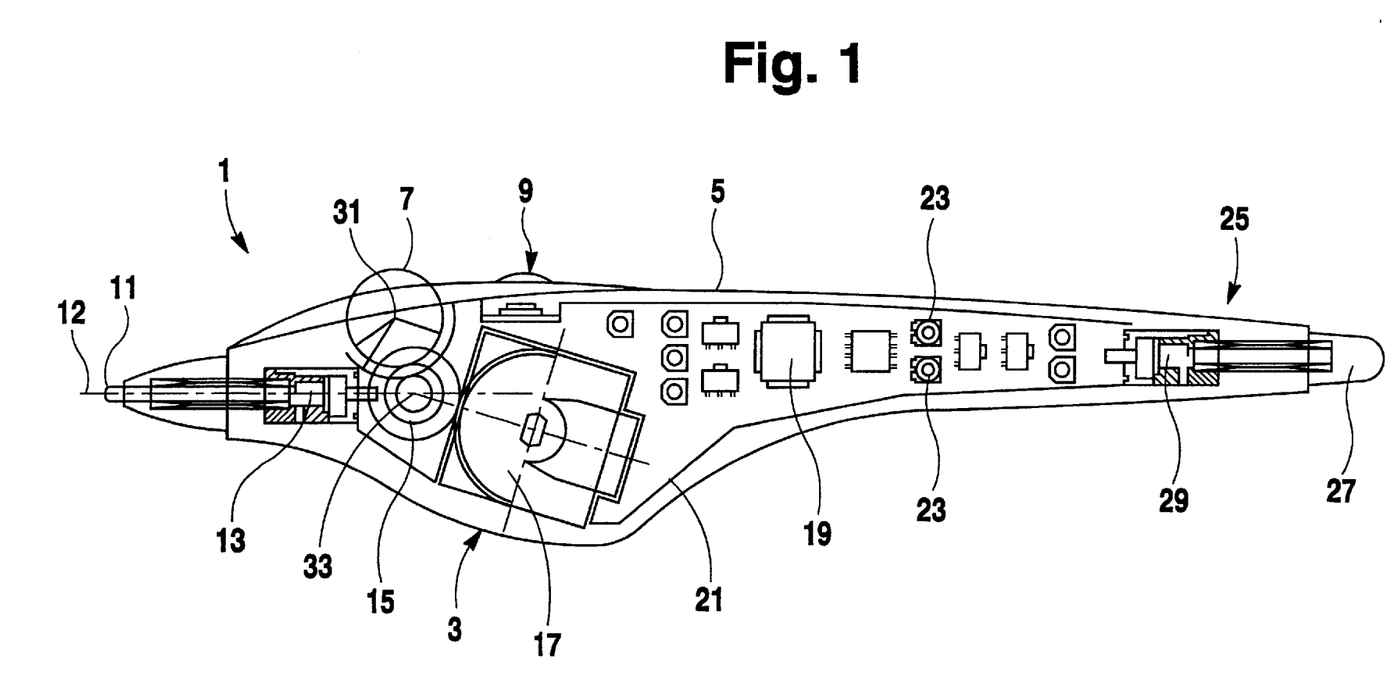
FIG. 1 is a side partial cross sectional view of an airbrush-simulating stylus including a finger wheel according to an embodiment of this invention.
Figure 2:
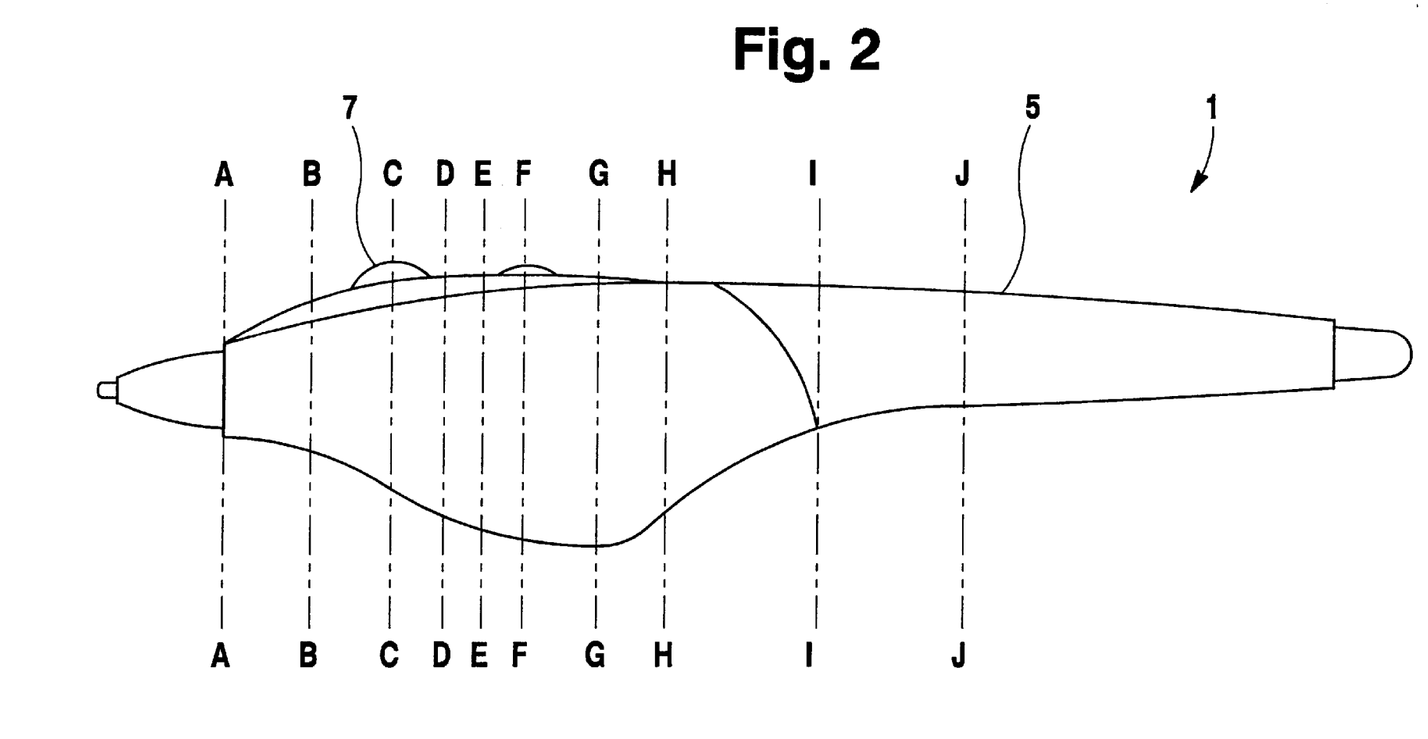
FIG. 2 is a side plan view of the airbrush-simulating stylus of FIG. 1.
Figure 3A:
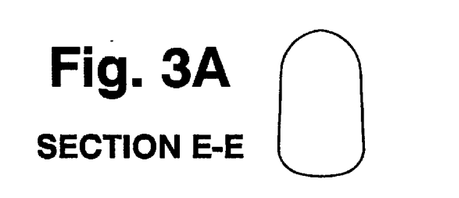
FIGS. 3(a) through 3(j) are front cross sectional views of the FIG. 1 stylus taken along the corresponding sectional lines shown in FIG. 2.
Figure 3B:
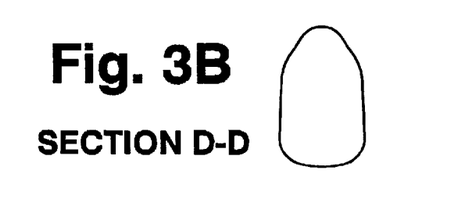
Figure 3C:
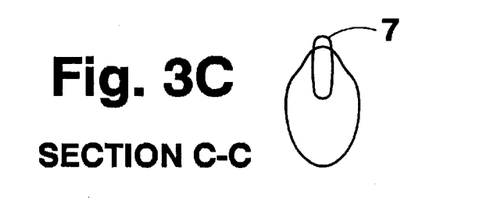
Figure 3D:
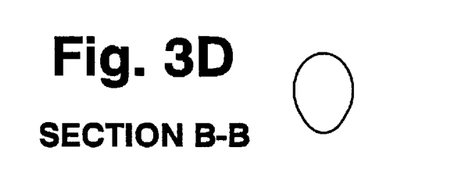
Figure 3E:
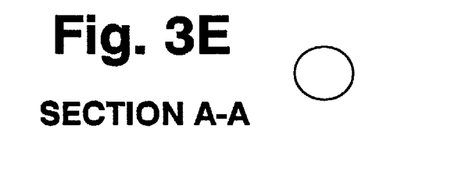
Figure 3F:
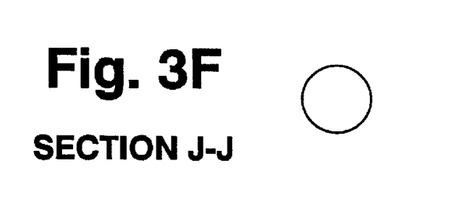
Figure 3G:
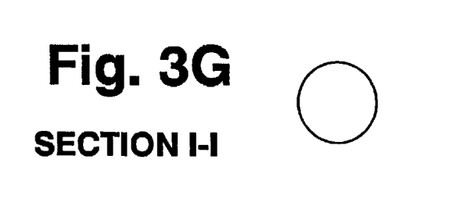
Figure 3H:
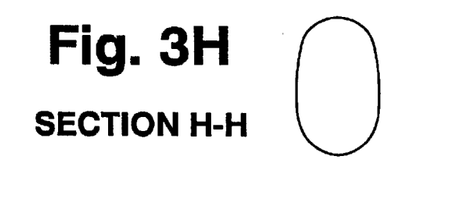
Figure 3I:
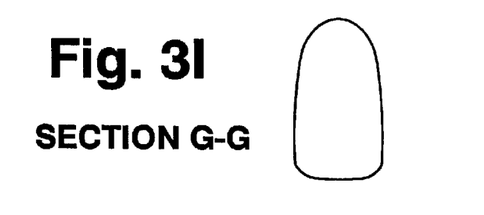
Figure 3J:
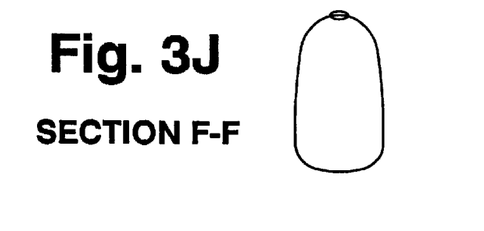
Figure 4:
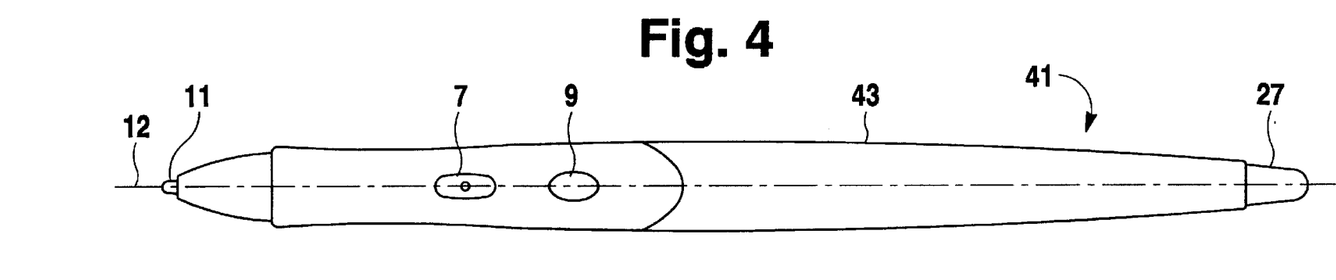
FIG. 4 is a top plan view of a stylus including a finger wheel according to another embodiment of this invention, this embodiment being elongated in design.
Figure 5:
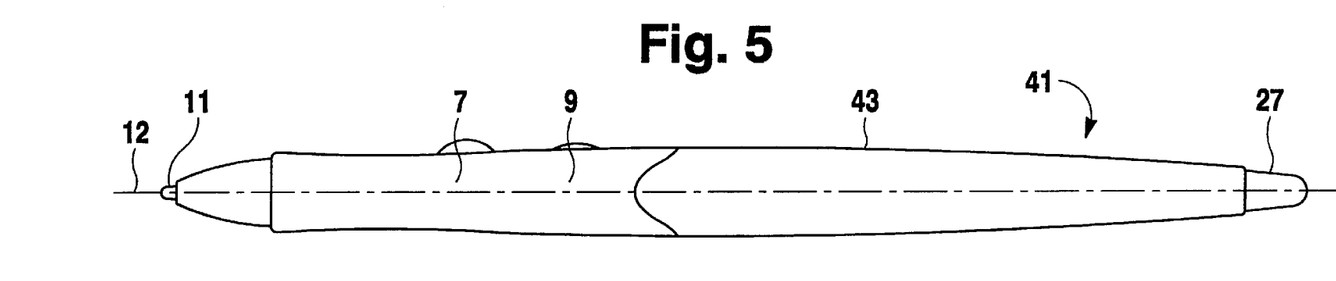
FIG. 5 is a side plan view of the stylus of the FIG. 4 embodiment.
Figure 6:
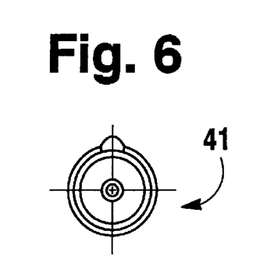
FIG. 6 is a front view of the FIG. 4 stylus, showing the finger wheel sticking up slightly relative to the stylus' housing.
Figure 7:
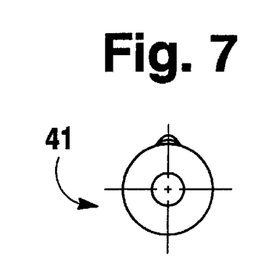
FIG. 7 is a rear view of the FIG. 4 stylus, showing a conventional on/off switch sticking up slightly relative to the stylus' housing.

FIGS. 1–3 show stylus 1 which simulates an air-brush according to an embodiment of this invention. Stylus 1 is not perfectly elongated in shape, but instead includes protruding grip area 3 which enables the stylus to simulate the shape of an airbrush. Stylus 1 includes hollow housing 5, rotatable finger wheel or dial 7 for inputting variable data depending upon the amount or degree to which the wheel is adjusted, on/off data input switch 9, pressure sensitive stylus tip 11 for contacting the tablet, longitudinal stylus axis 12, pressure sensing device 13 for sensing the amount of pressure the user applies to the stylus against the tablet via tip 11, intermediate gear wheel 15, rotary potentiometer 17 for sensing the angular degree to which finger wheel 7 is adjusted or rotated, main processing chip 19, printed circuit board 21 including at least one flat surface that defines a plane, trimmers 23, eraser assembly 25, eraser tip 27, and eraser pressure sensor 29. As illustrated, housing 5 includes an aperture or slit defined therein for allowing an upper portion of wheel 7 to protrude outwardly from the interior of housing 5 through the aperture or slit thereby causing the protruding portion of the wheel 7 to be exposed so that the user can touch it to cause wheel 7 to rotate about fixed wheel axis 31. In certain embodiments, wheel 7 is only permitted to rotate in one direction about axis 31 from its original neutral position (i.e. from a predetermined position) and then back to its neutral position, although bi-directional rotation relative to a predetermined position is possible in alternative embodiments.

Finger wheel 7 is mounted within housing 5 so as to be rotatable about fixed axis 31. A user of stylus 1 may use his/her finger (e.g. index finger) to manipulate wheel 7 so as to rotate it about axis 31 while drawing/writing. The periphery of wheel 7 is also in operative communication (e.g. contacting) with rotatable gear wheel 15. Gear wheel 15 is mounted within housing 5 so as to be rotatable about stationary axis 33. Gear wheel 15 is in operative communication (e.g. contacting) with both finger wheel 7 and potentiometer 17. Rotary potentiometer 17 determines how far (i.e. to what degree) gear wheel 15 rotates and thus to what degree the user has manipulated or rotated wheel 7. Thus, when the user rotates finger wheel 7 (either clockwise or counterclockwise) about axis 31, the rotation of wheel 7 causes gear wheel 15 to rotate in the opposite direction. Potentiometer 17 detects the degree of rotation of wheel 15 and thus can determine the degree or amount of rotation of finger wheel 7 caused by the user. Potentiometer 17, in combination with other circuitry in the stylus, then causes the stylus to output an electromagnetic wave signal to the tablet (or computer) indicating how far wheel 7 was detected to have been rotated. The amount or degree of rotation determines how much a chosen graphical parameter is varied.

Thus, the user can rotate finger wheel 7 so as to continually adjust graphics or control parameter data such as, for example, the thickness of the line/stroke being drawn, the shading of the line/stroke being drawn, the color of the line/stroke being drawn, the texture of the line/stroke being drawn, the density of the line/stroke being drawn, and/or the type of brush or stylus being simulated in the drawing of the line/stroke being drawn. In other words, wheel 7 is not an on/off switch, but is a variably rotatable wheel which can cause the stylus to output a plurality of different signals or levels dependent upon the direction and/or angular degree θ to which wheel 7 is rotated about axis 31. These different signals may be used to continually vary or adjust any of a plurality of parameters by different amounts while writing/drawing, including those listed above.

For example, if line thickness is the graphics parameter chosen to be adjusted by finger wheel 7, a line of a first thickness may be drawn via the tablet on a display by the stylus in a coordinate input system if wheel 7 is rotated ten degrees clockwise about axis 31 from a predetermined initial position, a line of a second thickness drawn if wheel 7 is rotated by twelve degrees clockwise about axis 31, a line of a third thickness drawn if wheel 7 is rotated by fourteen degrees clockwise about axis 31, and so on. Also, a line of varying thickness may be drawn if the user rotates wheel 7 while drawing the line.

In certain embodiments, the image parameter (e.g. line width, gray scale, color, etc.) to be altered or adjusted by finger wheel 7 is varied in a manner/amount as a linear function of the degree of rotation of wheel 7. For example, the width of the line being drawn by stylus 1 may increase a given amount (e.g. 0.1 mm) on a corresponding LCD display screen for every angular degree of rotation that wheel 7 is rotated from its origin about axis 31. In other embodiments of this invention, the parameter to be adjusted by wheel 7 may be varied in a non-linear manner with respect to the degree θ of wheel 7 rotation. In a non-linear example, the amount of increase for line thickness may be a first amount (e.g. 0.10 mm) for the first angular degree of wheel 7 rotation about axis 31, a second greater amount (e.g. 0.125 mm for a total increase of 0.225 mm) for the next angular degree of wheel 7 rotation, a third amount (e.g. 0.150 mm for a total thickness increase of 0.375 mm) for three angular degrees of rotation, etc.

In certain embodiments, wheel/dial 7 is not biased in any direction by any type of spring or the like, and requires user manipulation to rotate the wheel to and from all rotational positions. In alternative embodiments, finger wheel 7 may be biased toward a neutral or zero degree position (i.e. predetermined position). It may be biased to this position by a biasing spring, or any other type of biasing device. Thus, if the user rotates wheel 7 about axis 31 five degrees from the original or neutral position counterclockwise, the wheel 7 will automatically rotate back to the neutral position when the user lets go (i.e. releases) wheel 7 due to the biasing effect. Wheel 7 is biased in a manner such that it will rotate back about axis 31 to the neutral position from any position when the user releases or lets go of the wheel. Thus, when line width is the parameter to be varied by wheel 7, the stylus will output a signal indicating a given line width to be drawn when wheel 7 is in the neutral position. When wheel 7 is rotated about axis 31 in one direction the line width will get progressively smaller depending upon the degree of rotation so that the user can continuously vary the line width by varying the rotational position of wheel 7. When the user releases wheel 7, it will rotate back to the neutral position and the line width will go back to the given line width. However, when the user rotates wheel 7 about axis 31 in the other direction, the potentiometer will cause the stylus to output a signal instructing the system that the line width is to increase, and the line width of the image being drawn will progressively increase depending upon the degree of rotation. In a similar manner, when the user releases wheel 7, it is biased so as to rotate back to its original or neutral position and the line width will thus return to the aforesaid "given" width. The user can set or program the "neutral" position line width to any of a variety of different thicknesses. Alternatively, the wheel 7 only rotatable in one direction from its predetermined neutral position.

In certain preferred embodiments mentioned above, the finger wheel is not spring loaded or biased in any manner. In such embodiments, when rotated so that the protruding surface of the wheel is rotated all the way to its furthest position in one direction (e.g. all the way counterclockwise in FIG. 1), it will report a signal indicative of zero levels when at this predetermined position, and when the wheel is rotated all the way in the opposite direction, it will report a full number of levels. At rotational positions therebetween, the number of levels reported to the digitizer system by the stylus is a function of the rotational or radial angular position of the finger wheel relative to its zero-level predetermined position.

It is noted that in preferred embodiments, finger wheel 7 has a circular periphery which extends 360 degrees about axis 31 so as to form substantially a complete circle thereabout. It is noted that in certain embodiments, the upper section of the wheel for contact with finger(s) of the user may be rubber-coated 123 (see FIG. 20) for improved control by finger(s), while the lower portion (from about 120–130 angular degrees about axis 31) has gear teeth 101 for interacting with the gearwheel and is thus not rubber-coated. However, this need not be the case in all embodiments. Wheel 7 in certain embodiments may have only a partially circular periphery that extends less than 360 degrees about axis 31. For example, wheel 7 may take the shape of a half-pie (i.e. half-circle) or three quarters (i.e. 270°) of a pie in certain embodiments while still being referred to as a "wheel" 7. Also, the periphery of wheel 7 need not be continuous about axis 31.

Figure 18:
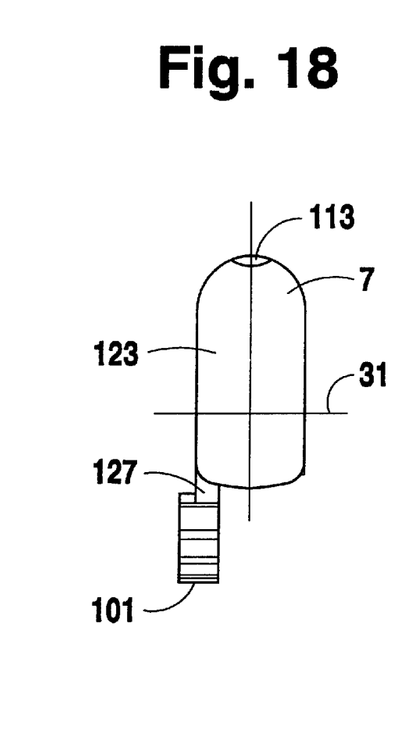
FIG. 18 is a rear plan view of the finger wheel of the FIGS. 14–17 embodiment of this invention.
Figure 19:
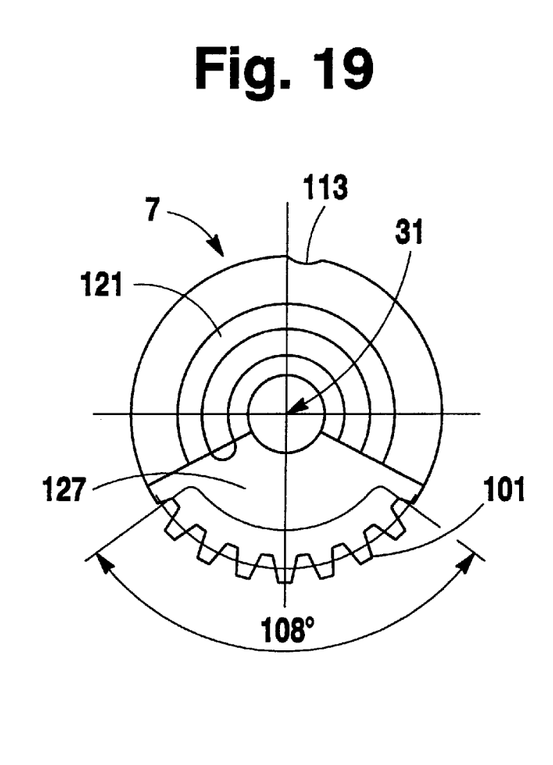
FIG. 19 is a side elevational view of the finger wheel of FIG. 18.
Figure 20:
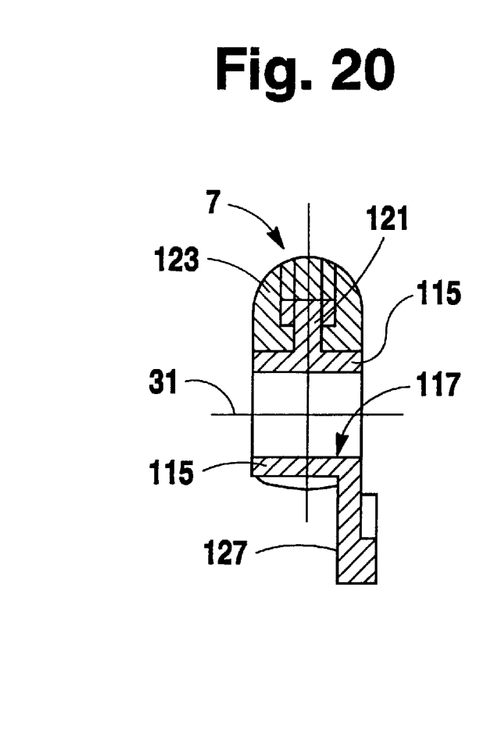
FIG. 20 is a front cross sectional view of the finger wheel of FIGS. 14–19.

In certain embodiments wheel/dial 7 is circular, although that it may take the form of other shapes such as oval, triangular, etc. Additionally, as shown in FIGS. 18–20, wheel/dial 7 need simply be rotatable about a central axis 31, and need not be perfectly circular or have equal thicknesses throughout to be a "wheel" or "dial" in accordance with this invention. The requirements for "wheel" or "dial" 7 is that it be rotatable in some manner about an axis (e.g. 31) in order to input variable data so as to adjust a parameter of an image being drawn by the stylus.

Still referring to the FIG. 1–3 embodiment, stylus 1 may include circuit board 21 positioned within housing 5 for the purpose of supporting numerous electronic chips (e.g. 19) and other circuitry utilized by the stylus. For example, as disclosed in U.S. Pat. No. 5,028,745, incorporated herein by reference, the stylus may include a tuning circuit mounted therein, including a coil and capacitor (see FIG. 13), so that the stylus does not require batteries and does not require a cord to connect the stylus to the tablet. Thus, stylus 1 in certain embodiments includes a tuning circuit and is not connected to the corresponding tablet in any way. Eraser system 25 may also be provided in optional embodiments. Still further, conventional on/off switch 9 may also be provided so as to simulate mouse "clicks" or other functionality in certain embodiments. Thus, while switch 9 has only two states in certain embodiments, (i.e. on and off), finger wheel 7 has a plurality of potential states equal to the number of potential angular positions that wheel 7 may be manipulated to. Wheel 7 is also positioned in certain embodiments, as illustrated in FIGS. 1–3, so that rotational axis 31 is substantially perpendicular to the elongated axis 12 of the stylus and also to the axis of eraser tip 27. However, it is envisioned that axis 31 may be moved ninety degrees from its illustrated position so that it would be substantially parallel to the axis 12 of the stylus and to the axis of eraser tip 27, and thus wheel 7 would be rotated by a finger of the user moving back and forth across the housing.

FIGS. 4–7 illustrate another embodiment of this invention including elongated stylus 41 which has finger wheel. Stylus 41 includes an elongated housing 43 which houses the elements discussed and illustrated above with regard to the FIG. 1–3 embodiment of this invention, which operate in the same manner described and shown above. Housing 41 does not include an airbrush simulating grip portion 3. This embodiment also does not include a gearwheel due to the size of the housing. finger wheel 7 is directly mounted on the rotary axis of the rotary potentiometer 17. Mechanically, there is reduced play between gears, and the design allows components to fit in the housing.

FIGS. 8–11 illustrate yet another embodiment of this invention, where stylus 44 includes elongated housing 45. This embodiment, like the FIG. 4 embodiment, may or may not include an airbrush simulating grip portion 3. However, the FIG. 8–11 embodiment of this invention does not include a finger wheel, but instead includes touch sensitive surface area 51 (i.e. touchpad) surrounded or outlined by ridge 53 about its periphery or outer area. Upwardly protruding fixed ridge 53 is for the purpose of providing tactile feedback to the user of finger position so that the user can tell where his/her finger is on the stylus relative to touch sensitive area 51. In certain embodiments the touch sensitive area may also be sensitive (e.g. via pressure sensitive area or switch 52 positioned underneath the touchpad surface 51, or via any other type of pressure sensitive device associated with touchpad 51) to how much pressure the user applies in the area 51 with his/her finger(s). Thus, area 51 may be sensitive to the position of a finger within the area and/or the amount of pressure applied by the finger(s) in the area. Touchpad 51 may detect finger position in either one dimension (e.g. x dimension) in area 51, or alternatively may detect finger location in two lateral dimensions (e.g. x and y), or alternatively may detect finger location in the x and y dimensions and also pressure or finger position in the perpendicular z dimension. Each different position/pressure in each of these dimensions causes the stylus to send a different level of detection back to the tablet system, with each level of detection differently affecting or adjusting the parameter to be varied in the image being written/drawn. The image parameter may be varied either linearly or non-linearly as a function of finger position and/or pressure.

Figure 8:
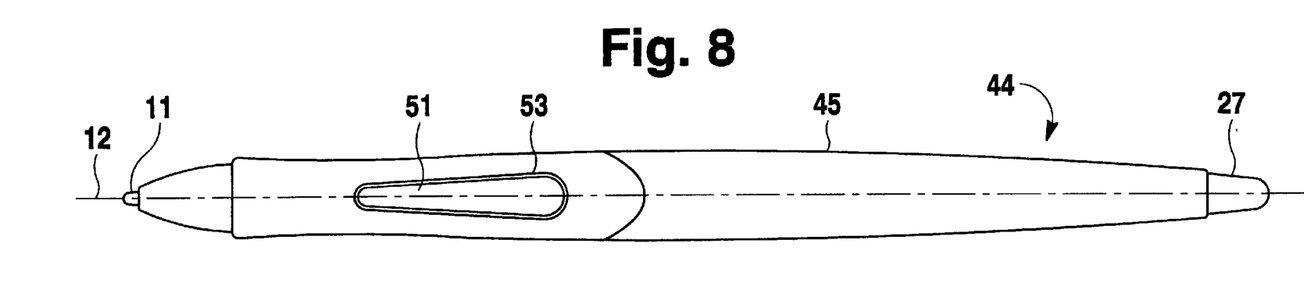
FIG. 8 is a top plan view of a stylus including a touch sensitive finger coordinate input pad or area according to yet another embodiment of this invention.

Touch sensitive area 51 may detect the lateral position of a finger of the user thereon by way of known capacitive touch detection technology, the surface of the touchpad including a matrix of membrane switches closeable via finger presence to connect a pair of conductors, piezoelectric sensing technology, optical sensing technology, surface acoustic wave sensing technology, resistive touch detection membrane technology, infrared (IR) sensitive technology, or any other known touch or heat sensitive technology. For example, touch sensitive area or touchpad 51 for detecting physical contact by a finger of a user may include touch sensitive and/or pressure sensitive technology disclosed in any of U.S. Pat. Nos. 4,739,299, 4,489,302, 4,314,277, 5,292,837, 5,543,589, 5,231,380, 4,302,011, 4,430,917, 4,391,746, 4,071,691, 5,327,161, and 5,666,113, the disclosures of which are hereby incorporated herein by reference. The processor 75 in the tablet system or a processor in the stylus itself interprets pad touches by fingers of the user, and interprets finger location in area 51 and/or pressure applied in area 51 by finger. The output of sensors of touchpad 51 are typically analog signals representing the location and/or pressure of a finger in area 51, but may be quickly converted to digital signals indicative of same, and the touch input signals indicating position and/or pressure on touchpad 51 may be sent from the stylus to the tablet in either digital or analog form.

In certain embodiments of this invention, the surface of touchpad 51 may be glass, polymer, rubber, or other similar material and may be coated with Teflon™ or some other low friction substance to make sliding over the surface as easy as possible. The touch sensing devices in area 51 may be continuous, or the surface may be divided into regions acting as switches, or sensing of finger position may be made by any combination thereof.

The position of a user's finger within area 51 is detected and determines how much the graphical parameter is adjusted. For example, the thickness of a line being drawn may be increased as the position of the user's finger in area 51 gets closer to the tip of the stylus within area 51, and may get thinner as the user's finger gets closer to the eraser end of the stylus in area 51. Exemplary image control or graphical parameters which may be varied by area 51 include those discussed above relative to other embodiments of this invention.

Touch or finger sensitive area 51 preferably does not stick up from the surrounding housing 45 of stylus 44, and requires no moving parts on the surface of the stylus or protruding from the stylus. In certain embodiments, area 51 follows the contour of the surrounding surface of housing 45, or alternatively may be flat in design. The circuit of FIG. 13 or any other appropriate stylus inclusive circuit causes the signal sent from the stylus to the tablet to indicate the position of the user's finger in the touch sensitive area and/or its applied pressure, so that the control or graphical parameter of the image being drawn/written may be adjusted in accordance with the finger's position in area 51, and/or in accordance with the pressure being applied by the finger in area 51.

Figure 9:
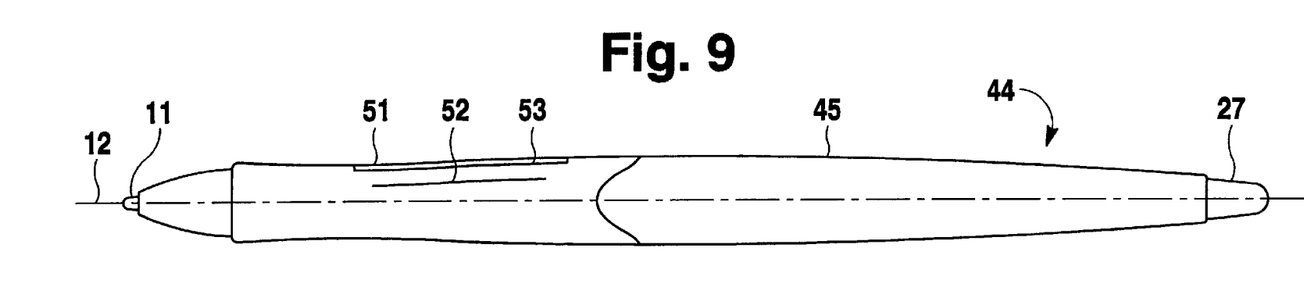
FIG. 9 is a side plan view of the FIG. 8 stylus.
Figure 10:
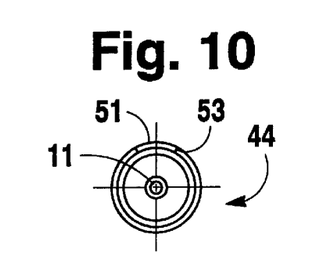
FIG. 10 is a front view of the FIG. 8 stylus, illustrating that the touch sensitive finger area of the FIG. 8 stylus is substantially level with, and does not stick up from, the stylus' housing.
Figure 11A:
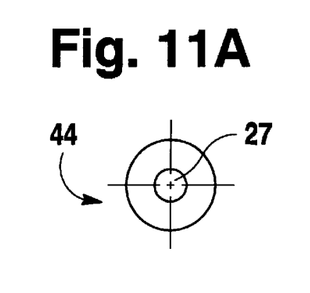
FIG. 11(a) is a rear view of the FIG. 8 stylus.
Figure 11B:
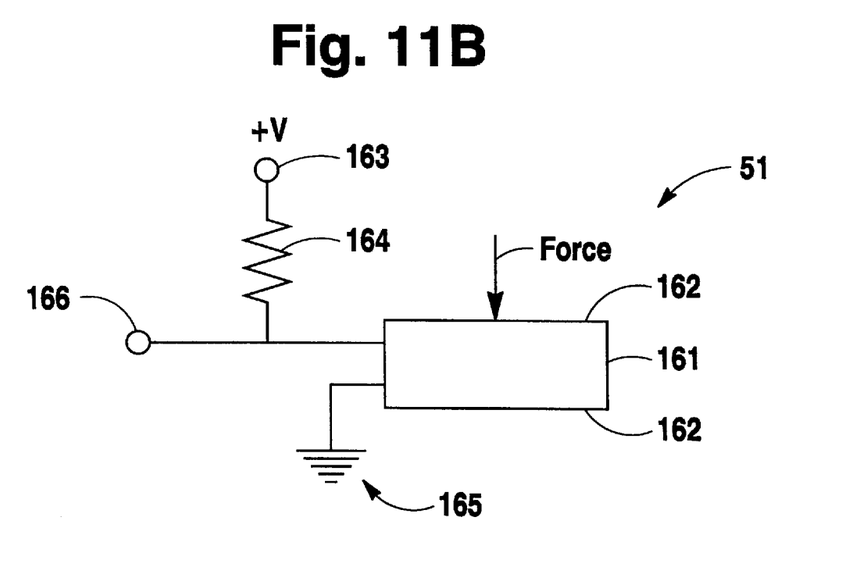
FIG. 11(b) is a schematic diagram of a touch pad which may be used in conjunction with the FIG. 8–10 embodiment of this invention.

FIG. 11(*b*) illustrates a touchpad 51 which may be used in the FIG. 8–10 embodiment of this invention, where the touchpad surface is made of a soft resistive material 161 such as Goop, and is provided with a Mylar support 162. Material 161 changes its electrical resistance as a function of the amount of force or pressure applied thereto. FIG. 11(*b*) illustrates a standard measurement of applied force in this regard. A known voltage is applied at 163 across resistor 164 and the pressure sensor to ground 165. The resistance of material 161 changes as a function of the force applied to it, and the voltage measured at 166 can then be used to determine the amount of force that was applied. In such a manner the position of a finger of the user, in the x-y two dimensional plane of the surface of the touchpad, can be determined as a function of variance in resistance in the surface material of the touchpad.

Figure 11C:
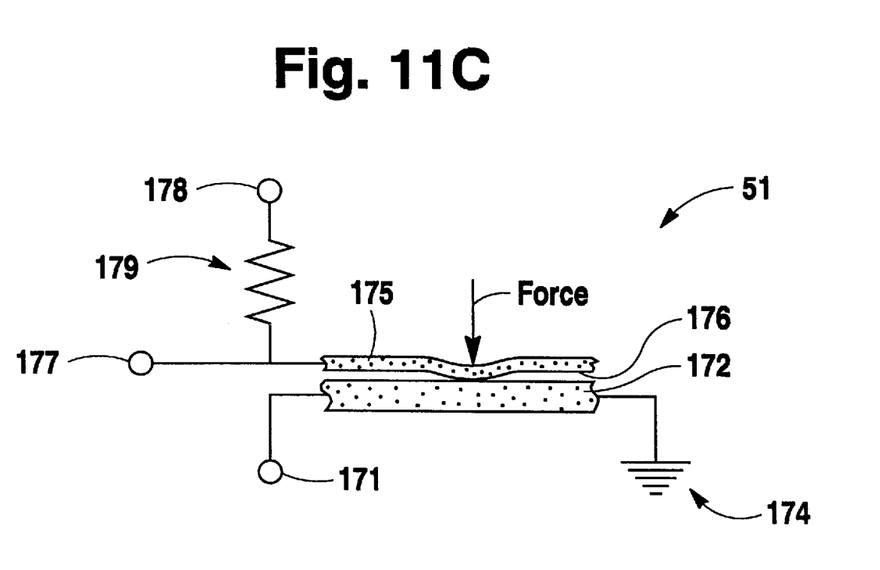
FIG. 11(c) is a schematic diagram of another touch pad which may be used in conjunction with the FIG. 8–10 embodiment of this invention.

FIG. 11(*c*) illustrates a touchpad 51 according to another embodiment of this invention which may be used in conjunction with the FIGS. 8–10 embodiment discussed herein. In FIG. 11(*c*), touchpad 51 detects both x and y location and applied pressure from a finger of a user. The sensor of FIG. 11(*c*) can be used to measure both the location of the applied force from the finger and its amount. In operation, touchpad 51 may intermittently switch between a location sensing mode and a force amount sensing mode to detect both.

Still referring to FIG. 11(*c*), in a finger location sensing mode a known voltage is applied at 171 across the length of Goop layer 172 to ground 174. Applying finger force onto flexible touch sensitive surface 175 creates a contact point between the conductive strip 176 in the top and the pressure-sensitive layer 172. This allows the touchpad system to measure a voltage at 177, which will change as a function of the location of the force along the length of the sensor (i.e. as a function of the relative resistance values of the Goop between electrode 171 and the force point, and the force point and electrode 174). In this embodiment, the sensor works similar to a standard variable resistor. The total force applied to the sensor has a minor impact on the measurement value (and could potentially be compensated for).

Still referring to FIG. 11(*c*), in a force sensing mode, a known voltage is applied from 178 across resistor 179 and the sensor unit to ground points 171 and 174. The total resistance between the force contact point and ground varies as a function of the total applied pressure by the finger and the location of the applied pressure. The voltage measured at 177 can be used to determine the amount of force applied to one point of the sensor, and the data from the location sensing mode can be used to apply a correction factor for the force location.

Figure 12:
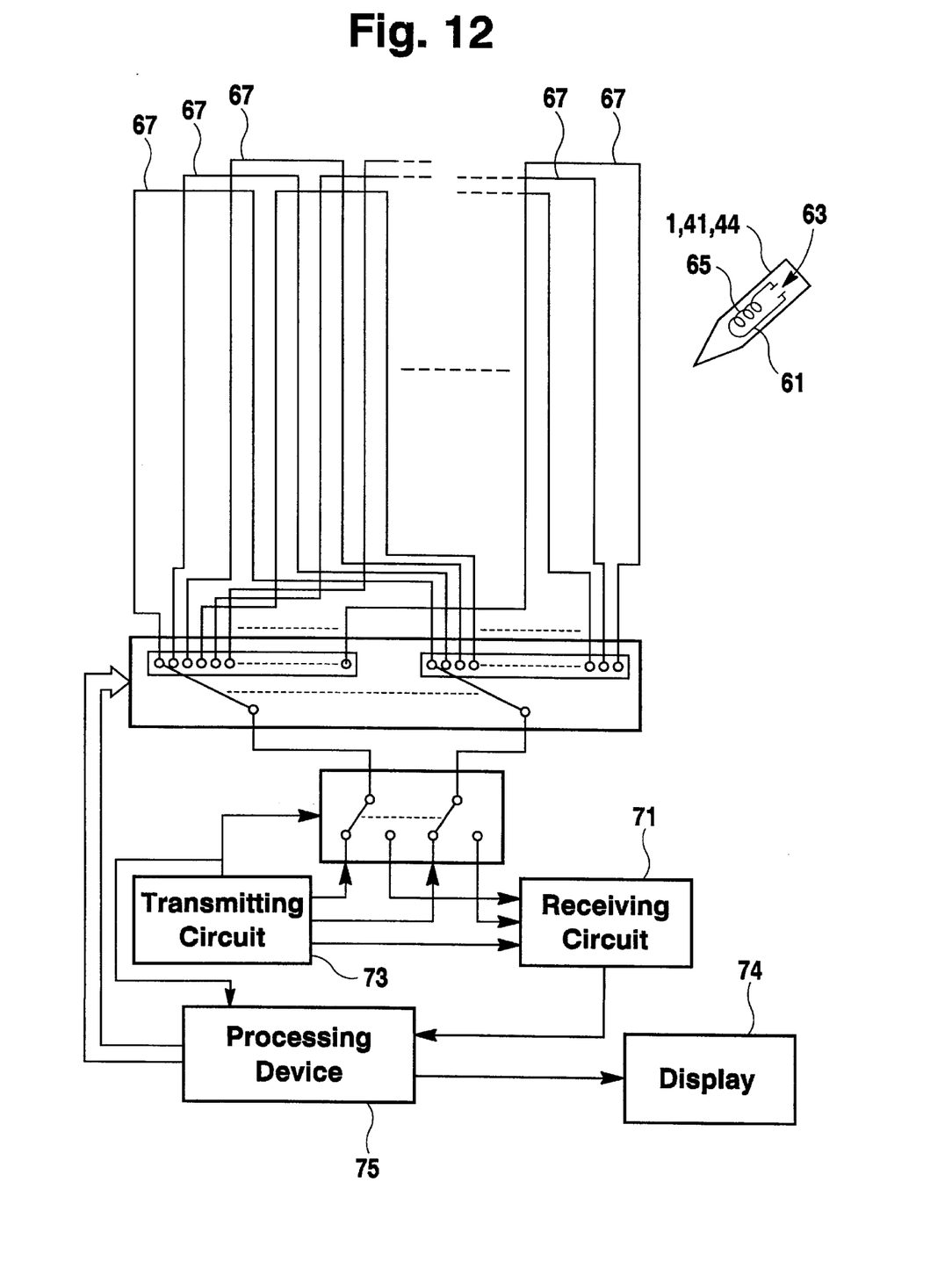
FIG. 12 is a schematic diagram illustrating a digitizer tablet system, the styli of all embodiments herein being useable in conjunction with the digitizer tablet coordinate input system of FIG. 12.

FIG. 12 illustrates a digitizer tablet system which any stylus of any embodiment of this invention may be used in conjunction with, although the styli of this invention may also be used in conjunction with any other conventional digitizer or other coordinate input systems. In accordance with the FIG. 12 embodiment of this invention, the stylus would include a tuning circuit 61 therein having, for example, a capacitor 63 operatively associated with an inductive coil 65. The stylus' tuning circuit 61 communicates with the tablet's overlapping conductive loop coils 67 as, for example, described in U.S. Pat. No. 5,028,745, in order to enable the loop coils of the tablet to detect the presence and location of the stylus. Loop coils of the tablet generate electromagnetic waves which are received by the stylus' tuning circuit 61 which then transmits another electromagnetic wave back to the tablet which is detected by loop coils of the tablet. The electromagnetic wave which is transmitted from the tuning circuit to loop coils of the tablet includes information therein which indicates the status or degree of rotation of wheel 7 (or area 51) as detected by potentiometer 17. This allows the stylus to indicate to the tablet the status of wheel 7 which in turn is used to vary the graphical parameter to be varied. In certain embodiments, the tuning circuit in the stylus receives waves from one set of loop coils in the tablet and sends waves back to the same set of loop coils so that the same tablet coils both transmit and detect waves. However, in other embodiments, the tuning circuit may send back waves to a different set of loop coils in the tablet than the coil(s) which sent energizing waves to the tuning circuit.

The tablet system may include receiving circuit 71, transmitting circuit 73, and processing device 75. Loop coils 67 of the tablet detect the waves sent from the stylus and detect the position of the stylus, with this information then being forwarded to processing device 75 which instructs the corresponding display system 74 as to the position of the stylus.

Figure 13:
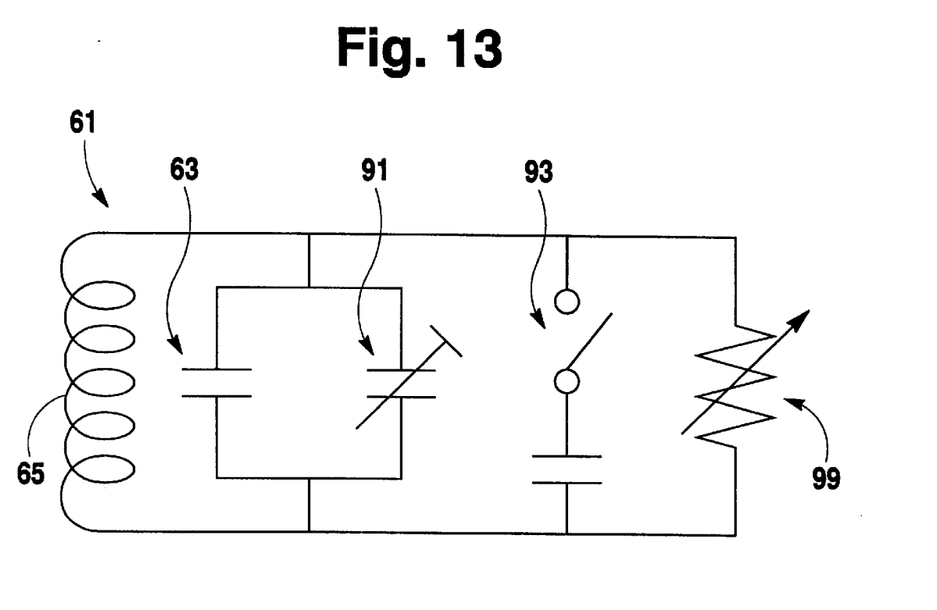
FIG. 13 is a circuit diagram illustrating circuitry, including a tuning circuit and a potentiometer in a stylus according to any embodiment of this invention.

FIG. 13 illustrates a circuit which may be utilized within any of the styli of the aforesaid embodiments of this invention. The stylus circuitry includes tuning circuit 61 including inductive coil 65 and capacitor 63. Variable capacitor 91 represents tip pressure sensitive switch 13 in that the capacitance will vary as a function of the pressure which is applied to the tablet surface by the stylus via tip 11. The tuning circuit has a resonant frequency capable of approximate tuning with the frequency generated from the loop coils of the tablet when electric power is applied to the sensing coils.

Also in the circuitry is switch 93 representative of on/off side switch 9. For example, the tuning circuit may emit frequency A when switch 93 is open and different frequency B when switch 93 is closed, or the phase of the signal output by the tuning circuit may change as a function of whether switch 93 is open or closed.

Potentiometer 17 includes a variable resistance 99 in certain embodiments which varies as a function of the rotational position of finger wheel 7. Thus, resistance 99 will have a first value when wheel 7 is in its neutral predetermined position, a second and different resistance when wheel 7 is rotated to a given point in the clockwise direction, and so on. Thus, each potential position of wheel 7 will dictate a given value of resistance 99 of the potentiometer. It is also recognized that a variable capacitance or a variable inductance could be used instead of variable resistance 99 for the potentiometer in certain alternative embodiments of this invention.

Figure 14:
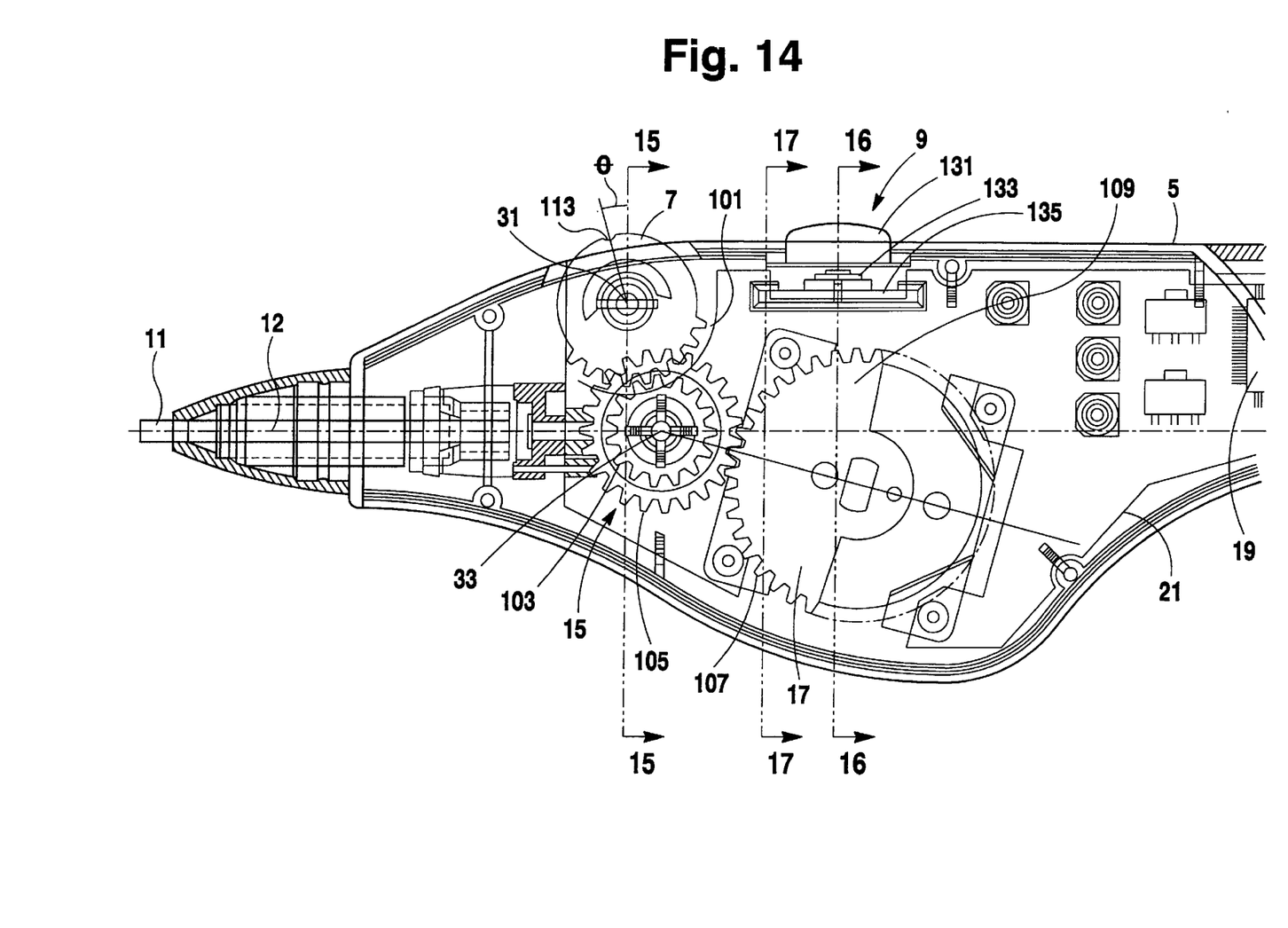
FIG. 14 is a side partial cross sectional view of an airbrush simulating stylus including a finger wheel according to the FIG. 1 embodiment of this invention, showing the interior of the stylus in more detail than in FIG. 1.
Figure 15:
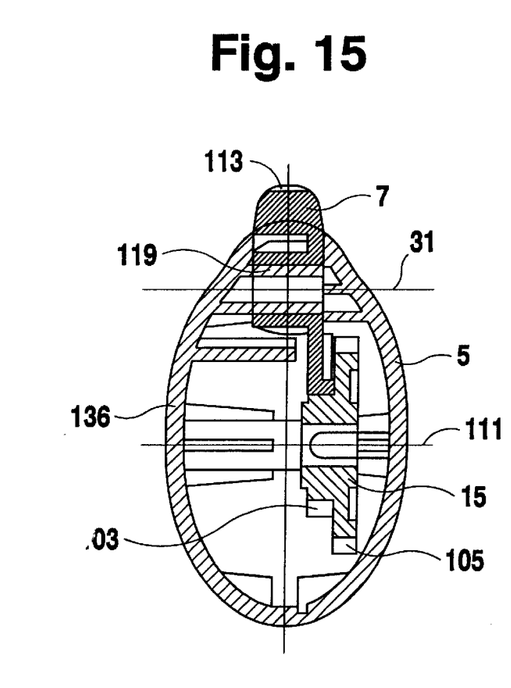
FIG. 15 is a front cross sectional view of the FIG. 14 stylus taken along sectional line 15—15 shown in FIG. 14.
Figure 16:
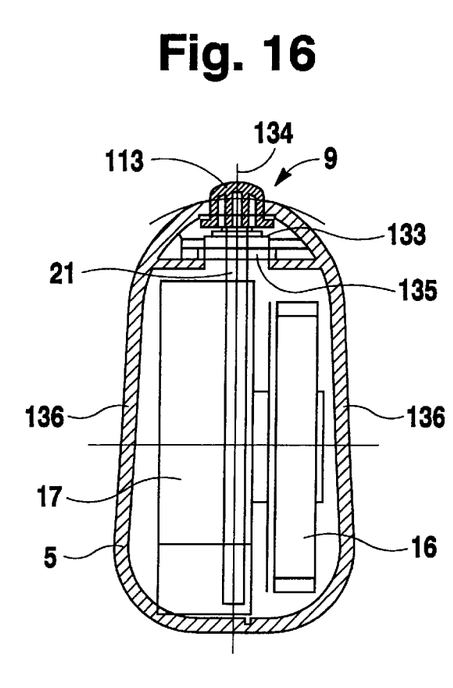
FIG. 16 is a front cross sectional view of the FIG. 14 stylus taken along sectional line 16—16 shown in FIG. 14.
Figure 17:
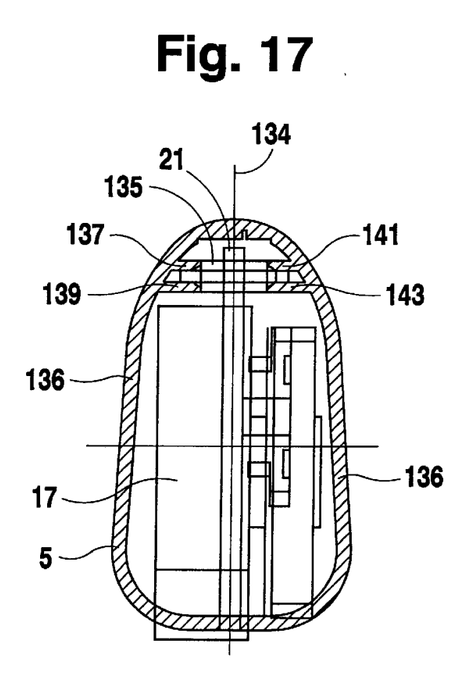
FIG. 17 is a front cross sectional view of the FIG. 14 stylus taken along the sectional line 17—17 shown in FIG. 14.

FIG. 14 is a partial enlarged view of the FIG. 1 stylus, showing in more detail finger wheel 7, gear wheel 15, and potentiometer 17. FIGS. 15–17 are front cross sectional views of the FIG. 14 stylus taken along the illustrated sectional lines. Additionally, FIGS. 18–20 show finger wheel 7 of the embodiment of FIG. 14.

Referring to FIGS. 14–20, in certain embodiments of this invention finger wheel or dial 7 defines a peripheral surface which is at least partially toothed 101. For example, as shown in FIGS. 14 and 18–20, more than half of the outer diametric periphery of wheel 7 is approximately smooth and does not have teeth defined therein. However, a plurality of teeth 101 (e.g. seven) are provided along a lower portion of the periphery of wheel 7. Potentiometer wheel 16 is driven by gear wheel 15. As shown best in FIG. 19, the outer peripheral portion of the wheel 7 including teeth 101 defined therein represents an arc of from about 80–140 degrees about axis 31, more preferably from about 90–130 degrees, and most preferably about 108 degrees, where the center of wheel also defines the center of the arc. The remainder of the outer periphery of wheel 7 is substantially free of teeth. The toothless portion of the outer periphery of wheel 7 is for the user to contact with his/her finger(s) in order to rotate the wheel/dial 7 in order to alter a parameter of the image being drawn/written with the stylus, and the toothed portion of wheel 7 is typically not exposed for user manipulation and is for interacting with corresponding teeth 103 defined in a peripheral portion of intermediate gear wheel 15 (or gears of a potentiometer), as shown in FIGS. 14 and 15.

Teeth 103 of gear wheel 15 mesh with and interact with teeth 101 of finger wheel 7, while teeth 105 of gear wheel 15 mesh with and interact with teeth 107 of potentiometer dial portion 17. Arcuately relative to the center thereof, from about 40–180 degrees of the periphery of a rotatable wheel or disc of potentiometer 17 includes teeth 107 in certain embodiments.

Intermediate gear wheel 15 includes a diametric peripheral first portion which includes teeth 103 and a diametric peripheral second portion which includes teeth 105 defined therein. The peripheries of these first and second coaxial portions are substantially annular in shape about axis 33, and are preferably covered by teeth 103 and 105, respectively, around all 360 degrees thereof. Alternatively, portions of these peripheries of gear wheel 15 need not be covered by teeth. The outer or larger peripheral toothed portion which includes teeth 105 has a substantially larger diameter than the inner or smaller peripheral portion which includes teeth 103, so that the rotatable wheel or toothed portion of the potentiometer (which is caused to rotate by teeth 105) is rotated at a different speed than wheel 7. Teeth 101 of finger wheel 7 mesh with teeth 103 of gear wheel 15 thereby causing the gear wheel to rotate along with the finger wheel. When gear wheel 15 is caused to rotate in such a manner, this causes its outer periphery including teeth 105 to also rotate. Teeth 105 mesh with teeth 107 of the potentiometer wheel or dial and cause it to rotate about its center axis. The degree to which the potentiometer dial or wheel 109 rotates about its axis determines the output of the potentiometer and is a function of the degree of rotation of finger wheel 7.

As shown in FIG. 15, gear wheel 15 may be formed of a single integrally formed piece of plastic or metal, with teeth 103 and 105 defined in the two coaxial, yet offset, peripheral portions thereof. As shown in FIG. 15, outer peripheral teeth 105 and inner peripheral teeth 103 each form a substantial circle about the same axis 111. However, teeth 103 are laterally offset slightly from teeth 105 so that the teeth 101 of wheel 7 can contact teeth 103 without meshing or contacting teeth 105, while teeth 105 are simultaneously meshing with and causing gear teeth 107 of the potentiometer to rotate thereby enabling the potentiometer to detect the degree to which wheel or dial 7 has been rotated from a predetermined position.

It should be noted that pulleys, cable, belts, or any other linkage could be used instead of the intermediate gear wheel to transfer rotary movement from the finger to a detecting device such as a potentiometer.

As shown in FIGS. 18–20, finger wheel 7 is rotatable about axis 31. Optionally, notch 113 may be defined in the outer periphery of the wheel to enable a user to feel where a given portion of the wheel is positioned radially relative to the stylus housing. For example, when the wheel 7 is in its zero or any other predetermined position, notch 113 may be located in the middle of the slit in the housing of the stylus, and directly above axis 31 as shown in FIGS. 15 and 19. When the user desires to change the position of the wheel or dial 7 thereby adjusting a parameter of the image being drawn, then the user may rotate the wheel about axis 31 in a rotational direction away from the predetermined position to, for example, the position illustrated in FIG. 14 where notch 113 has been rotated θ degrees counterclockwise to a new position. The degree θ of angular rotation which wheel/dial 7 is rotated from its predetermined position dictates the amount which the parameter is altered. The angular degree θ of rotation is detected by potentiometer 17 as discussed above.

Still referring to FIGS. 18–20, dial/wheel 7 may, in certain embodiments, include an integrally formed portion 115 of molded plastic or metal. Integral portion 115 defines central cavity 117 encompassing axis 31 which enables wheel 7 to fit over tube 119 as shown in FIG. 15 (i.e. tube 119 or any other elongated member fits into annular or otherwise shaped cavity 117 so that the wheel can rotate relative thereto about axis 31, as the tube and wheel are substantially coaxial). Integral portion 115 further includes substantially T-shaped annular projection 121 in certain embodiments for allowing rubber or elastomer peripheral grip material 123 to be attached to an outer portion of wheel 7. In certain embodiments elastomeric gripping material 123 is attached to wheel 7 at peripheral portions thereof which do not include teeth 101 (e.g. T-shaped connection member 121 need not be located in toothed areas of the wheel). Portion 121 and elastomeric material portion 123 are each at least partially annular in shape about axis 31, in that each at least partially arcs about central wheel axis 31 to some angular degree. Integral portion 115 of wheel 7 further includes tooth base portion 127 in which teeth 101 are defined. Tooth base 127 is at least partially annular in shape about axis 31 as shown in FIG. 19, and in certain embodiments, may extend outwardly from a central area of portion 115, and include teeth 101 defined in an outer peripheral portion thereof as shown in FIGS. 18–20. Tooth base portion 127 defines an annular arc about axis 31 to the same degree as do teeth 101, or a slightly larger arc in certain embodiments (e.g. from about 80–140 degrees, more preferably from about 90–130 degrees about axis 31). Additionally, although annular T-shaped member 121 (and grip portion 123) and tooth base portion 127 may co-occupy arcuate space about axis 31 in certain embodiments, this is not the case in the embodiment illustrated in FIGS. 18–20, where T-shaped portion 121 occupies a given portion of the 360 degree arc about axis 31 and portion 127 occupies substantially the rest of the arc about axis 31 where T-shaped portion 121 is not positioned.

Still further with reference to FIGS. 18–20, tooth support portion 127 of wheel/dial 7 has a first axial thickness relative to axis 31, while the central portion 115 of wheel/dial 7 has a second greater axial thickness relative to axis 31, with the greater axial thickness of portion 115 enabling the grip member 123 to be more adequately attached to the dial, and the thinner nature of portion 127 and thus teeth 101 defined therein enabling teeth 101 and portion 127 to fit into teeth 103 of gear wheel without interfering with teeth 105.

Another unique aspect of this invention is shown best in FIGS. 14, and 16–17, and relates to the supporting structure for switch 9. In this embodiment, substantially flat circuit board 21 defines a plane the top of which is viewed in FIG. 14. This plane of board 21 extends downward in FIG. 14 from the top of the stylus toward its bottom, and has chip 19 mounted thereon.

Switch 9 includes finger button 131 and pressure sensitive switching detection mechanism 133. Detection mechanism 133 is mounted upon approximately flat platform or surface 135. Platform 135 may be part of switch 9 (switch 9 may be an on/off switch, or any other type of pressure sensitive device capable of outputting multiple signals based upon the amount of pressure received), or alternatively may be a support surface for supporting device(s) which are part of the switch. In either case, stationary platform 135 is operatively associated with switch 9 and button 131, and is located below button 131 along button axis 134. As shown best in FIG. 17, surface 135 is mounted between a first support structure extending from one side of the housing interior including parallel support extensions 137 and 139, and a second support structure extending from the other or opposite side of the housing interior including parallel support extensions 141 and 143. Support extensions 137, 139, 141, and 143 each define a plane substantially perpendicular to that of circuit board 21. Supports 137, 139, 141, and 143 may be of plastic and integrally formed with hollow stylus housing 5, although they alternatively may be of metal, or also may not be integrally formed with the housing and may be simply attached to the interior thereof.

As best shown in FIGS. 15–17, the plane of circuit board 21 is substantially parallel (i.e. parallel plus of minus about ten degrees) to the illustrated housing sidewall portions 136 in FIGS. 15–17, and also substantially perpendicular to the plane of platform 135. In other words, axis 134 along which button 131 is pressed (and released) during switch operation is substantially parallel to (i.e. parallel plus or minus about ten degrees), or even co-planar with in certain embodiments, the plane of circuit board 21. Button movement axis 134 (see FIG. 16) is also substantially perpendicular to the planes defined by supports 137, 139, 141, and 143, as well as to surface 135. This unique positioning of circuit board 21 relative to the switching mechanism and switch support structures enables the finger wheel structures to be fit into a smaller housing. While in the illustrated embodiments of this invention, button 131 is part of an on/off switch 9, this need not be the case in all embodiments as it is recognized that switch 9 may instead be a variable pressure sensitive switch can detect a plurality (e.g. five, ten, a hundred, or even a thousand) different pressure levels applied to the button by the user.

Once given the above disclosure, may other features, modifications, and improvements will become apparent to the skilled artisan. Such other features, modifications, and improvements are therefore considered to be a part of this invention, the scope of which is to be determined by the following claims.

We claim:

1. A stylus for use in a digitizer coordinate input system, the stylus comprising:

a housing;

electronic circuitry disposed within said housing;

a rotatable finger wheel or dial that is rotatable about a central axis by a user, wherein a degree θ to which said finger wheel is rotated determines the extent to which a control or graphical parameter utilized by the digitizer coordinate input system is varied;

said finger wheel including a plurality of teeth defined in a peripheral portion thereof;

a gear wheel including a first set of teeth for meshing with said teeth of said finger wheel and a second set of teeth for meshing with corresponding teeth on a potentiometer so that the potentiometer detects said degree θ to which said finger wheel is rotated and causes said parameter to be varied as a function thereof; and wherein said first set of teeth on said gear wheel defines a peripheral portion having a different diameter than a peripheral portion of said second set of teeth on said gear wheel.

2. The stylus of claim 1, wherein said finger wheel includes an integrally formed portion including an at least partially annular T-shaped portion for enabling a grip portion to be mounted on said finger wheel.

3. The stylus of claim 2, wherein said grip portion includes an elastomeric material attached to less than the entire periphery of said finger wheel, and wherein said T-shaped portion extends around less than 360 degrees about said central axis of said wheel and said T-shaped portion extends annularly around at least 180 degrees about said central axis.

4. The stylus of claim 1, wherein said wheel axis is oriented substantially perpendicular to a longitudinal axis of said stylus, and wherein said teeth of said finger wheel extend over an arc ranging from about 80–140 degrees about said central axis of said finger wheel.

5. The stylus of claim 1, further including a tuning circuit for receiving electromagnetic waves from loop coils of a tablet and for transmitting electromagnetic waves to loop coils of the tablet.

6. The stylus of claim 5, wherein the loop coils from which the waves are received are different than the loop coils to which the waves from the tuning circuit are transmitted.

7. The stylus of claim 1, wherein the finger wheel is not spring-biased to any position, and the stylus outputs a signal to a corresponding tablet system which indicates the rotational position of the finger wheel relative to a predetermined rotational position.

8. The stylus of claim 1, wherein the housing includes an aperture defined therein for allowing said finger wheel to protrude outwardly through said aperture.

9. The stylus of claim 1, wherein the parameter includes one of: line thickness, scrolling, navigating, color, shading, gray scale, and texture.

10. A graphics coordinate input system including a digitizer tablet and the stylus of claim 1.

* * * * *